(12) United States Patent
Gerk et al.

(10) Patent No.: US 9,879,333 B2
(45) Date of Patent: *Jan. 30, 2018

(54) HARD METAL COMPOSITION

(71) Applicant: H.C. STARCK GMBH, Goslar (DE)

(72) Inventors: Christian Gerk, Ostlutter (DE); Markus Zumdick, Vienenburg (DE)

(73) Assignee: H. C. STARCK GMBH, Goslar (DE)

( * ) Notice: Subject to any disclaimer, the term of this patent is extended or adjusted under 35 U.S.C. 154(b) by 755 days.

This patent is subject to a terminal disclaimer.

(21) Appl. No.: 14/354,139

(22) PCT Filed: Oct. 26, 2012

(86) PCT No.: PCT/EP2012/071254
§ 371 (c)(1),
(2) Date: Apr. 25, 2014

(87) PCT Pub. No.: WO2013/060839
PCT Pub. Date: May 2, 2013

(65) Prior Publication Data
US 2014/0322064 A1  Oct. 30, 2014

(30) Foreign Application Priority Data
Oct. 27, 2011 (DE) .......... 10 2011 117 042

(51) Int. Cl.
C22C 29/08   (2006.01)
B22F 3/10    (2006.01)
B32B 5/16    (2006.01)

(52) U.S. Cl.
CPC ............ C22C 29/08 (2013.01); B22F 3/1035 (2013.01); B32B 5/16 (2013.01); B22F 2302/10 (2013.01)

(58) Field of Classification Search
CPC . C22C 29/00; C22C 29/08; B22F 3/00; B22F 3/1035; B22F 2302/10
See application file for complete search history.

(56) References Cited

U.S. PATENT DOCUMENTS 4,610,931 A * 9/1986 Nemeth ................. C22C 29/04
                                                           419/14
5,776,593 A    7/1998 Massa et al.
(Continued)

FOREIGN PATENT DOCUMENTS

CN      1050908 A       4/1991
DE   199 24 683 C2     11/2000
(Continued)

OTHER PUBLICATIONS

"Process parameter optimization of pulsed electric current sintering of recycled WC-8Co powder" Cura et al. Estonian Journal of Engineering, 2009, 15, 5, 255-265. doi: 10.3176/eng.2009.4.02. Published Apr. 2, 2009.*

(Continued)

*Primary Examiner* — Jennifer A Smith
*Assistant Examiner* — Alexandra M Moore
(74) *Attorney, Agent, or Firm* — Norman B. Thot

(57) ABSTRACT

A process for producing a component includes providing a composition comprising hard material particles and a binder metal, and sintering the composition at a sintering temperature of from 1250° C. to 1400° C. for a period of from 3 to 15 minutes. The hard material particles comprise an inner core comprising fused tungsten carbide and an outer shell comprising tungsten carbide. The binder metal is selected from the group consisting of Co, Ni, Fe and alloys comprising at least one metal selected from Co, Ni and Fe.

12 Claims, 3 Drawing Sheets

(56) References Cited

U.S. PATENT DOCUMENTS

| | | |
|---|---|---|
| 6,592,304 B1 | 7/2003 | Kammerer |
| 2007/0079905 A1 | 4/2007 | Gerk |
| 2009/0285712 A1 | 11/2009 | Benno Gries et al. |
| 2010/0196734 A1* | 8/2010 | Svec .................. B22F 1/025 |
| | | 428/548 |
| 2010/0206640 A1 | 8/2010 | Lockwood et al. |
| 2011/0171484 A1* | 7/2011 | Konyashin ............. C23C 26/02 |
| | | 428/556 |
| 2013/0068365 A1 | 3/2013 | Gerk et al. |

FOREIGN PATENT DOCUMENTS

| | | | |
|---|---|---|---|
| DE | 695 16 312 T2 | 11/2000 | |
| DE | 103 54 543 B3 | 8/2005 | |
| DE | 10 2006 045 339 B3 | 4/2008 | |
| DE | 10 2010 014 267 A1 | 10/2011 | |
| WO | WO 2012098102 A1 * | 7/2012 | ............ B22F 3/1028 |

OTHER PUBLICATIONS

ASTM B 214-07: "Standard Test Method for Sieve Analysis of Metal Powders", ASTM International, pp. 1-4 (Jan. 2007).
ASTM B 611-85: "Standard Test Method for Abrasive Wear Resistance of Cemented Carbides", ASTM International, pp. 1-2 (Oct. 2005).

* cited by examiner

HARD METAL COMPOSITION

CROSS REFERENCE TO PRIOR APPLICATIONS

This application is a U.S. National Phase application under 35 U.S.C. § 371 of International Application No. PCT/EP2012/071254, filed on Oct. 26, 2012 and which claims benefit to German Patent Application No. 10 2011 117 042.5, filed on Oct. 27, 2011. The International Application was published in German on May 2, 2013 as WO 2013/060839 A1 under PCT Article 21(2).

FIELD

The present invention relates to a process for producing a component, which comprises sintering a composition comprising hard material particles and binder metals, and also a component which is obtainable by such a process. The present invention additionally relates to the use of the component under highly erosive and/or abrasive conditions, for example, as a chisel in road construction, as a part of a drill bit, or as a wear part, for example, as a plate for protecting surfaces.

BACKGROUND

Fused tungsten carbide (FWC) is, owing to its extreme wear resistance, a preferred material for components which are subjected to highly erosive and/or abrasive conditions, such as welded wear protection layers or drill bits for oil and gas exploration. The excellent wear resistance of fused tungsten carbide is based on its particular microstructure which is made up of alternating lamellae consisting of tungsten carbide (WC) and ditungsten carbide ($W_2C$). Fused tungsten carbide is usually processed by infiltration with copper-based solders or welding by means of spontaneously flowing nickel-containing alloys. Owing to the processing by infiltration or by welding, the content of the metallic binder phase is usually 20-40% by weight. In comparison, the binder content (binder=Co or Ni) of commercial WC—Co or WC—Ni cemented hard materials is significantly lower at 3-15%. For the purposes of the present invention, a cemented hard material is a sintered component which essentially comprises a hard material, for example, a carbide such as tungsten carbide, and a metallic binder such as cobalt or nickel. Since the wear properties of FWC are superior to WC, a demand exists for fused tungsten carbide for making cemented hard materials having a significantly lower binder content of <20% industrially usable.

The reason for the lack of usability of fused tungsten carbides in cemented hard materials is essentially that:
a) the fused tungsten carbide particles are dissolved by diffusion in Co in the solid state and also in the liquid phase which arises during sintering and consists essentially of cobalt and/or nickel;
b) the advantageous lamellar structure is thermally/chemically transformed during the sintering process; and
c) the component cannot be sintered so as to be free of pores.

DE 199 24 683 C2 describes the use of fused tungsten carbide in the head of a round-shaft chisel. In DE 199 24 683 C2, the chisel head is produced by infiltration and not by sintering.

SUMMARY

An aspect of the present invention is to provide a process for producing a pore-free cemented hard material comprising fused tungsten carbide having an intact lamellar structure (also referred to as a feather-like structure) while at the same time using a metallic binder.

In an embodiment, the present invention provides a process for producing a component which includes providing a composition comprising hard material particles and a binder metal, and sintering the composition at a sintering temperature of from 1250° C. to 1400° C. for a period of from 3 to 15 minutes. The hard material particles comprise an inner core comprising fused tungsten carbide and an outer shell comprising tungsten carbide. The binder metal is selected from the group consisting of Co, Ni, Fe and alloys comprising at least one metal selected from Co, Ni and Fe.

BRIEF DESCRIPTION OF THE DRAWINGS

The present invention is described in greater detail below on the basis of embodiments and of the drawings in which.

DETAILED DESCRIPTION

Figure 1:
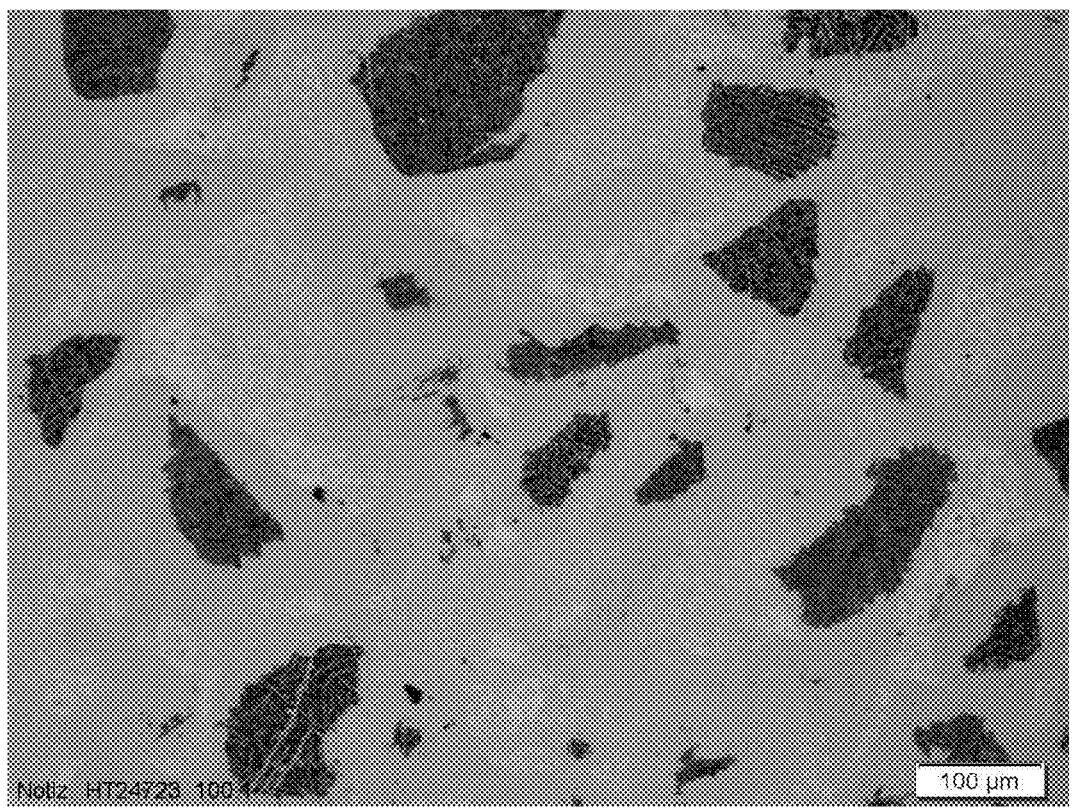
FIG. 1 shows the microstructure of cemented hard materials comprising fused tungsten carbide (FWC) where the FWC particles have a fine lamellar structure made up of WC and $W_2C$.

It has surprisingly been found that fused tungsten carbide can be used as a material for cemented hard materials, provided that they are chemically stabilized and the sintering process is conducted in a specific way. It has surprisingly been found that the transformation of the fused tungsten carbide into macroline FWC consisting of a core of fused tungsten carbide (FWC) and a shell of tungsten carbide (WC) provides sufficient stabilization to produce sintered cemented hard materials. Under appropriate sintering conditions, the WC shell offers sufficient protection against the metallic melt.

In an embodiment, the present invention provides a process for producing a component which comprises sintering a composition comprising:
a) hard material particles comprising an inner core of fused tungsten carbide and an outer shell of tungsten carbide; and
b) binder metals selected from the group consisting of Co, Ni, Fe and alloys thereof comprising at least one metal selected from among Co, Ni and Fe, wherein the sintering is carried out in a temperature range from 1250° C. to 1400° C. over a period of from 3 to 15 minutes. Sintering can, for example, be carried out at a gas pressure below $10^{-2}$ bar.

A constituent of the composition to be sintered are hard material particles comprising an inner core of fused tungsten carbide (FWC) and an outer shell of tungsten carbide (WC). In an embodiment of the present invention, the hard material particle can, for example, have an inner core of fused tungsten carbide and/or an alloy comprising fused tungsten carbide and at least one further carbide of the elements selected from groups 4B, 5B and 6B of the Periodic Table of the Elements, and an outer shell of an alloy comprising tungsten carbide and/or at least one further carbide of the elements selected from groups 4B, 5B and 6B of the Periodic Table of the Elements. If the inner core or the outer shell of the hard material particles consists of an alloy of fused tungsten carbide and a further carbide of the elements selected from groups 4B, 5B and 6B of the Periodic Table of the Elements, i.e., at least one carbide of the elements Ti, Zr, Hf, V, Nb, Ta, Cr, Mo, the total content of further carbides can be up to 10% by weight, based on the hard material particles.

The hard material particles used for the purposes of the present invention (hereinafter referred to as "macroline FWC" for short) are, for example, fused tungsten carbide particles or alloys thereof with at least one carbide of the elements Ti, Zr, Hf, V, Mo, Nb, Ta and Cr and with a shell of tungsten carbide.

Fused tungsten carbide (FWC) is a mixture of WC and $W_2C$, which is, for example, a eutectic microstructure composed of WC and $W_2C$.

FCW is a eutectic mixture of WC and ditungsten carbide ($W_2C$) in which the average carbon mass ratio is generally in the range from 3.8 to 4.2% by weight. This corresponds to a phase distribution of 73-80% by weight of $W_2C$ and 20-27% by weight of WC. FWC has a very fine-grained crystal microstructure which is often described as a lamellar structure (also referred to as a feather-like structure) and is obtained by the rapid quenching of a carbide melt. The shell of the particles consists of tungsten monocarbide, also referred to as tungsten carbide WC.

An example of a fused tungsten carbide having a WC shell is macroline fused tungsten carbide (MWC, the Amperweld® powder series from H.C. Starck GmbH).

The hard material used according to the present invention, the macroline FWC, can be obtained by transforming FWC into WC by carburization to a desired depth, and can generally be used for producing wear protection layers and wear-resistant components.

The macroline FWC used according to the present invention displays excellent toughness and hardness of the FWC in the core of the WC/FWC composite which is retained even when it is processed in a conventional way, i.e., brought into contact with a liquid matrix material.

The hard material used according to the present invention can, for example, have a content of bound carbon of from 4 to 6% by weight, for example, from 4.5 to 5.5% by weight. The content of free carbon should not exceed 0.1% by weight.

A sufficiently dense WC shell is not formed if the content of bound carbon is less than 4% by weight so that no increase in the chemical resistance compared to FWC is observed. If the content of bound carbon approaches the limit value of 6.13% by weight corresponding to pure WC, the FWC core becomes so small that an increase in hardness compared to pure WC is no longer achieved.

The advantageous properties of the hard material powder used according to the present invention are also retained when it has a small proportion of WC particles, i.e., not all powder particles are made up of a core of FWC and a WC shell. Such tungsten carbide powders can therefore likewise be used according to the present invention.

According to the present invention, it is thus also possible to use a powder mixture which consists of tungsten carbide particles and fused tungsten carbide particles having a tungsten carbide shell.

At least 70%, for example, at least 80%, for example, at least 90%, of the powder particles can, for example, have a core of FWC and a WC shell.

The average particle size can vary within a wide range and depends on the planned use.

The particle size determined by means of RoTap sieve analysis in accordance with ASTM B 214 can generally be up to 3000 µm. It can be advantageous to use a particle size fraction determined by means of RoTap sieve analysis in accordance with ASTM B 214 of from 3 µm to 1500 µm, for example, from 5 µm to 1000 µm, for example, from 5 µm to 500 µm, for example, from 10 µm to 300 µm, or, for example, from 10 to 180 µm.

The average particle size can, for example, be set by selection of a FWC powder having a particular average particle size as a starting material for producing the macroline FWC. It is also possible, for example, to mix particular particle fractions from previously produced macroline FWC or separate off particular fractions, for example, by sieving or classifying.

In the hard material powder used according to the present invention, the FWC core is surrounded by a dense shell of tungsten monocarbide. The thickness of the shell, determined by means of optical microscopy on etched material, can, for example, be from 0.05 to 0.4 times the average particle size determined by means of RoTap sieve analysis in accordance with ASTM B 214, for example, from 0.05 to 0.15 times the average particle size.

Macroline FWC has excellent hardness. The Vickers hardness can, for example, be >2000 $HV_{0.1}$, for example, >2500 $HV_{0.1}$.

The morphology of the particles can, for example, be set by use of a suitable FWC powder.

The hard material powder used according to the present invention can accordingly have various morphologies, for example, crushed with sharp edges or spherical. The spherical morphology in principle offers advantages with respect to wear resistance, however, it is more difficult to produce than powder having an irregular morphology. It is also possible to use mixtures of powders of differing morphologies.

The hard material powder used according to the present invention can be obtained by a process for producing the tungsten carbide according to the present invention (macroline FWC) in which fused tungsten carbide powders are heated in the presence of a carbon source to a temperature of from 1300° C. to 2000° C., for example, from 1400° C. to 1700° C.

The process can be carried out in the presence of inert gas, in the presence of reactive gas, or under reduced pressure. It can, for example, be carried out in the presence of hydrogen.

A suitable reactive gas is, for example, a gaseous carbon source, for example, carbon monoxide, a $CO/CO_2$ mixture, a hydrocarbon, or a hydrocarbon mixture such as natural gas.

Possible sources of carbon are gaseous and solid carbon sources. As a solid carbon source, it is possible to use, for example, carbon black or graphite. It is also possible to use mixtures of various gaseous and/or solid carbon sources.

The thermal treatment of FWC in the presence of the carbon source results in transformation of FWC into WC at the surface. A dense WC layer is thus formed around the FWC.

Temperature, reaction time and the amount of the carbon source added are selected so that the shell of WC is formed with the desired thickness. Care should be taken to provide that FWC remains in the interior of the particles. The conditions to be adhered to are determined by the particle size and particle shape of the FWC powder used, and can be determined by means of trials. If the carbon content is set too high, the time and temperature required for the reaction is increased and unnecessarily reduces the proportion of the lamellar microstructure, i.e., the proportion of FWC. It can be advantageous to add the carbon source in an amount so that the total carbon content of the reaction mixture, i.e., the sum of the carbon contents of FWC and carbon source, is from 4 to 6% by weight, for example, from 4.3 to 5.5% by weight.

In the reaction of FWC with powder particles having very different particle sizes, relatively fine particle fractions are carburized more strongly in relation to their particle diameter than large particles. This applies particularly to powders having a high fines content of <45 μm and can be prevented by a prior removal of the proportion of fines and a separate reaction of the various powder fractions. The reaction times are usually from 1 to 10 hours, for example, from 1.5 to 7 hours.

To produce the component according to the present invention, it is possible to use, for example, crushed or spherical FWC which is sieved to the desired particle size as a starting material. The material is subsequently intimately mixed with a carbon source, for example, carbon black, in the desired amount, subjected to a heat treatment, and in the process carburized on the outer surface layer. The heat treatment can be carried out using conventional tunnel kilns or comparable apparatuses which can be operated, for example, in the temperature range between 1550° C. and 1900° C. under a hydrogen atmosphere or a protective gas. The mixture of FWC and carbon black can, for example, be placed in graphite boats. In the reaction, the carbon reacts with the $W_2C$ present in the FWC and transforms this into WC which can then no longer be distinguished from the WC already present. The WC layer formed in this way forms a natural diffusion barrier for the carbon so that the desired carburization depth can be controlled via the parameters time and temperature.

Binder metals are a further constituent of the composition to be sintered according to the process of the present invention to produce the component. The binder metals are selected from the group consisting of cobalt, nickel and iron and also alloys comprising at least one metal selected from among cobalt, nickel and iron.

Binder metal alloys can, for example, encompass cobalt and cobalt-nickel alloys having a nickel content of, for example, up to 25% by weight.

The sintering of the composition comprising the hard material particles and the binder metals is carried out in a temperature range from 1250° C. to 1400° C. for a period of from 3 to 15 minutes. Sintering can, for example, be carried out at a reduced gas pressure which can, for example, be below $10^{-2}$ bar. In an embodiment, sintering can, for example, be carried out at temperatures of from 1300° C. to 1370° C.

It can be advantageous to keep the sintering time as short as possible. In an embodiment, sintering can, for example, be carried out at the sintering temperatures for a period of from 3 to 10 minutes.

According to the present invention, sintering is preferably carried out as liquid-phase sintering.

Good results can be achieved when sintering is carried out at a gas pressure of less than $10^{-3}$ bar, for example, at less than $10^{-4}$ bar. In an embodiment of the process of the present invention, heating of the composition up to the desired sintering temperature can, for example, be carried out at a heating rate of above 50 K/min, for example, above 80 K/min, for example, in the range from 90 to 120 K/min. To obtain a pronounced lamellar structure of the hard material particles, it can be advantageous to carry out cooling after the sintering operation, for example, in the temperature range from the sintering temperature to 500° C., at a cooling rate of less than 100 K/min, for example, less than 80 K/min, for example, in the range from 30 K/min to 70 K/min.

With a view to achieving essentially pore-free components, it can be advantageous to carry out sintering of the composition with the aid of pressure. The application of a pressing force of from 20 to 80 MPa, for example, from 30 to 50 MPa, to the composition to be sintered can, for example, be useful. Sintering in which an additional pressing force is exerted on the composition gives components which have a reduced number of pores, for example, components which are essentially pore-free.

The composition to be sintered can, for example, comprise from 60 to 95% by weight, for example, from 70 to 90% by weight, of hard material particles, where the percentages by weight are based on the total weight of the composition.

In an embodiment, the composition can, for example, comprise from 5 to 40% by weight, for example, from 10 to 30% by weight, of binder metal, where the percentages by weight are based on the total weight of the composition.

The present invention further provides a component which is obtainable by the process of the present invention.

In an embodiment, the component can, for example, have a lamellar structure in the interior of the fused tungsten carbide particles.

The components of the present invention have a microstructure of alternating lamellae consisting of tungsten carbide and ditungsten carbide ($W_2C$) in the interior of the fused tungsten carbide particles.

The components of the present invention display surprisingly good wear properties.

The present invention therefore further provides for the use of the component of the present invention under highly erosive and/or abrasive conditions, for example, as a chisel in road construction, as a part of a drill bit, or as a wear part, for example, as a plate for the protection of surfaces.

EXAMPLES

Figure 3:
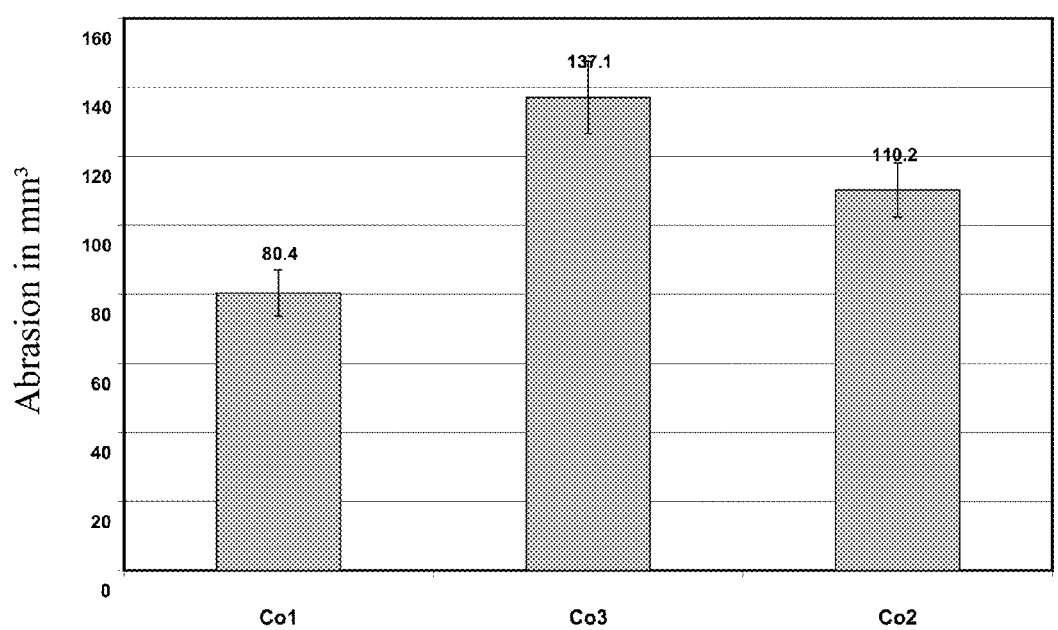
FIG. 3 shows the results of wear tests.

Example 1 (Denoted by "Co1" in FIG. 3)

76% by weight of fused tungsten carbide (FWC) [particle size: 150 μm] and 17% by weight of tungsten carbide (WC) [particle size: 6 μm] were sintered together with 15% by weight of cobalt for 3 minutes at 1370° C.

Sintering was carried out under reduced pressure ($<10^{-3}$ mbar) and at a pressing force of 45 MPa.

Example 2 (Denoted by "Co2" in FIG. 3)

72% by weight of FWC (particle size: 300 μm), 18% by weight of WC [particle size: 6 μm] and 10% by weight of cobalt were sintered for 3 minutes at 1320° C. under reduced pressure ($<10^{-3}$ mbar) and at a pressing force of 45 MPa.

Example 3 (Denoted by "Co3" in FIG. 3)

68% by weight of FWC (particle size: 150 μm), 17% by weight of WC [particle size: 6 μm] and 15% by weight of cobalt were sintered for 3 minutes at 1330° C. under reduced pressure ($<10^{-3}$ mbar) and at a pressing force of 45 MPa.

Figure 2:
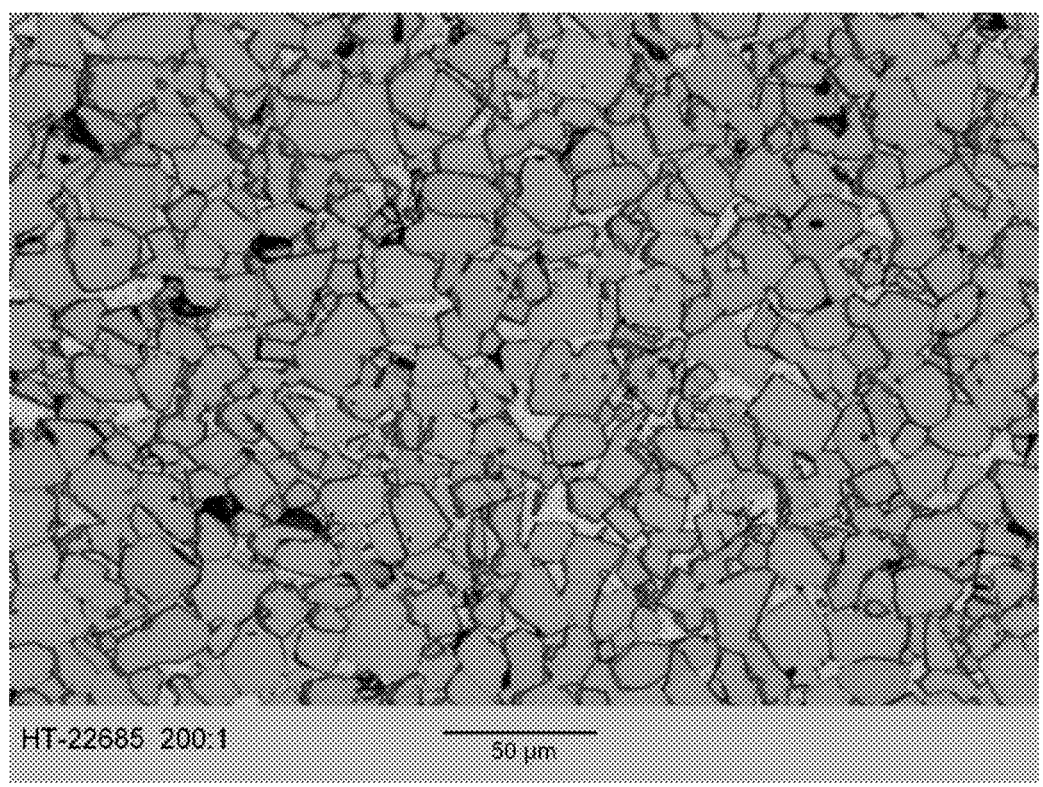
FIG. 2 shows a conventional, extra-coarse cemented hard material.

Comparative Example (See FIG. 2)

92% by weight of fused tungsten carbide were sintered together with 8% by weight of cobalt for 45 minutes at 1420° C. under reduced pressure.

Structure

The microstructure of the cemented hard materials comprising fused tungsten carbide (FWC) was characterized by the FWC particles having a fine lamellar structure made up of WC and $W_2C$ (see FIG. 1). In comparison, FIG. 2 shows a conventional, extra-coarse cemented hard material.

Since the wear properties of FWC are strongly dependent on the fine structure of the lamellae (a coarsened microstructure displays a significant deterioration in the wear properties), densification of the FWC-containing cemented hard material was carried out by means of a brief sintering process in order to retain the fine lamellar structure. The binder content can furthermore be set in a controlled manner in the range from 5% to 40% by changing from the infiltration process to the sintering process.

Wear Properties

FIG. 3 shows the results of wear tests (ASTM B611-85 (2005)). The particularly small decrease in volume is conspicuous. In the case of the normal, extra-coarse cemented hard materials, which are customarily used in the field of drilling & mining, this is above 300 mm³ (in accordance with ASTM B611-85).

The present invention is not limited to embodiments described herein; reference should be had to the appended claims.

What is claimed is:

1. A process for producing a component, the process comprising:
   providing a composition comprising:
      hard material particles comprising an inner core comprising fused tungsten carbide and an outer shell comprising tungsten carbide, and
      a binder metal selected from the group consisting of Co, Ni, Fe; and
   sintering the composition at a sintering temperature of from 1250° C. to 1400° C. for a period of from 3 to 15 minutes,
   wherein, the sintering is carried out at a gas pressure of less than $10^{-3}$ bar.

2. The process as recited in claim 1, wherein the hard material particles further comprise a content of bound carbon of from 4 to 6 wt %, based on the total hard material particles.

3. The process as recited in claim 1, wherein a thickness of the outer shell is about 0.05 to 0.4 times an average particle size of the hard material particles.

4. The process as recited in claim 1, wherein
   the inner core comprises at least one of the fused tungsten carbide and an alloy comprising the fused tungsten carbide and at least one further carbide of the elements selected from groups 4B, 5B and 6B of the Periodic Table of the Elements, and
   the outer shell comprises an alloy comprising the tungsten carbide and at least one further carbide of the elements selected from groups 4B, 5B and 6B of the Periodic Table of the Elements.

5. The process as recited in claim 1, wherein the sintering is carried out at a sintering temperature of from 1300° C. to 1370° C.

6. The process as recited in claim 1, wherein the sintering is carried out for a period of from 3 to 10 minutes.

7. The process as recited in claim 1, wherein the sintering is a liquid-phase sintering.

8. The process as recited in claim 1, wherein the sintering is carried out by heating at a heating rate of above 50 K/min until the sintering temperature is attained.

9. The process as recited in claim 1, further comprising cooling the composition from the sintering temperature to 500° C., wherein the cooling is carried out at a cooling rate of below 100 K/min.

10. The process as recited in claim 1, wherein the composition comprises from 60 to 95 wt % of the hard material particles and from 5 to 40 wt % of the binder metal, in each case based on a total weight of the composition.

11. The process as recited in claim 1, wherein the sintering is carried out while applying a pressure of from 20 to 80 MPa to the composition.

12. A process for producing a component, the process consisting of:
   providing a composition consisting of:
      hard material particles consisting of an inner core comprising fused tungsten carbide and an outer shell comprising tungsten carbide, and
      a binder metal selected from the group consisting of Co, Ni, Fe;
   sintering the composition at a sintering temperature of from 1250° C. to 1400° C. for a period of from 3 to 15 minutes; and
   cooling the composition from the sintering temperature to 500° C., wherein the cooling is carried out at a cooling rate of from 30 to 70 K/min.

* * * * *